United States Patent [19]

Ingoldsby

[11] 3,757,058

[45] Sept. 4, 1973

[54] RECORDING ENHANCEMENT SYSTEM USING TWO TAPE PLAYING DEVICES RUNNING AT DIFFERENT BETWEEN-HEAD TRANSIT TIMES

[75] Inventor: Brian D. Ingoldsby, Los Angeles, Calif.

[73] Assignee: Ira Goldenring, Sherman Oaks, Calif. ; a part interest

[22] Filed: Apr. 19, 1971

[21] Appl. No.: 135,132

[52] U.S. Cl. 179/100.2 RE, 179/100.1 TD, 179/1 GQ

[51] Int. Cl.. G11b 23/18, G11b 27/08, G11b 21/00

[58] Field of Search ............ 179/100.2 RE, 100.2 E, 179/100.2 MD, 100.1 TD, 1 GA, 1 GP, 1 J, 1 GQ; 84/DIG. 26, 29

[56] References Cited

UNITED STATES PATENTS

| | | | |
|---|---|---|---|
| 3,095,482 | 6/1963 | Whiteford | 179/100.2 RE |
| 2,733,301 | 1/1956 | Bradbury | 179/100.2 RE |
| 3,087,988 | 4/1963 | Somer | 179/100.2 RE |
| 3,444,330 | 5/1969 | Battle | 179/100.2 RE |
| 3,519,762 | 7/1970 | Morris | 179/100.2 RE |
| 3,286,042 | 11/1966 | Dorf | 179/100.2 RE |
| 768,541 | 8/1904 | Ries | 179/100.2 MD |

*Primary Examiner*—Bernard Konick
*Assistant Examiner*—Alfred H. Eddleman
*Attorney*—Allan M. Shapiro

[57] ABSTRACT

A system for enhancing a magnetic tape master recording played back on an apparatus having first and second reproduce heads respectively spaced along the direction of tape travel. The playback output of the first reproduce head is recorded by a magnetic tape recording apparatus having a third reproduce head situated downstream of the record head and adapted to play back information just recorded. By adjusting the between head tape transit time in the recording apparatus to be slightly different from that of the master playback apparatus, and combining the playback outputs of the second and third reproduce heads, an enhanced version of the master recording is produced. The system also may be used to produce "quad" sound from a prerecorded two-channel stereophonic tape.

11 Claims, 2 Drawing Figures

PATENTED SEP 4 1973 3,757,058

INVENTOR.
BRIAN D. INGOLDSBY
BY Allan M. Shapiro
ATTORNEY

RECORDING ENHANCEMENT SYSTEM USING TWO TAPE PLAYING DEVICES RUNNING AT DIFFERENT BETWEEN-HEAD TRANSIT TIMES

BACKGROUND OF THE INVENTION

1. Field of the Invention

The present invention relates to a system for enhancing a magnetic tape master recording, and also to an apparatus for producing "quad" sound from convention two-channel stereophonic tapes.

2. Description of the Prior Art

In the production of commercial recordings, instrumental and vocal portions of a musical selection generally are recorded separately on individual tracks of a master magnetic tape. Typically, some or all of the instrumetalists will play through the selection, and a number of "takes" will be recorded until a perfect performance is achieved. Next, the vocal portion of the selection is recorded, with the vocalist singing while listening on earphones to a playback of the instrumental portion. Again, a number of takes may be necessary before an acceptable performance is achieved.

Typically, the recording process is not complete at this point, since the recorded voice may be too "small," that is, lacking in harmonics or power characteristic of a "big sound." In the past, this problem has been handled by having the vocalist again sing the number while listening to a playback of the earlier, perfect recording. The vocalist attempts to repeat the selection exactly in unison with the previous performance, so as to produce an enhanced recording comprising the original perfect take, combined with the revocalization. Clearly, this is a difficult task, as it is almost impossible for an artist to perform a number twice with the same musical nuances. As a result, many many takes are necessary to achieve a recording acceptable for commercial release. This enhancement technique is time comsuming, exhausting for the performer and expensive.

An analagous problem arises with regard to the instrumental portions of the recording. By way of example, the producer may wish to obtain a recording which sounds like 30 violins playing in unison. This could be achieved by hiring 30 violinists, but this is expensive, and the greater the number of musicians, the more difficult it is to achieve a perfect take. As an alternative, the producer may hire six violinists, and have them repeat the performance five times, each time recording "on top of" the previous take, so as to achieve a superimposed recording which sounds like the desired 30 violins. Again, it is difficult to repeat a perfect performance while listening to the one recorded earlier. Moreover, musicians generally are paid at a rate based on the number of "takes," so little or no dollar saving may be realized using the multiple recording technique.

In the past, attempts have been made to enhance electronically a master recording of a perfect take, thereby eliminating the need for the musician to repeat this performance to enhance the earlier take. Primarily, these attempts involve increasing the volume of the vocal portion with respect to the instrumental background. This approach is unsatisfactory, since the harmonic content of the vocal portion remains unchanged, and a "big sound" is not achieved.

While various magnetic tape editing systems have been suggested in the past, none is satisfactory for solving the problem just described. By way of example, U.S. Pat. No. 2,279,018 to Wolfe, and U.S. Pat. No. 2,733,301 to Bradbury, both show sound recording systems useful for adjusting the relative amplitude of multiple recordings being combined into a single master. As noted, systems which permit only relative amplitude or volume control are not applicable to producing a "big sound."

Various editing systems have been suggested for insertion or removal of brief portions of a recording. For example, certain systems use moving record/reproduce heads, or a rapidly accelerated, bin-stored magnetic tape segment to accomplish word insertion or removal. Such devices are useful for correcting short duration errors on a tape, and thus may be used, e.g., to delete an incorrect note in a song. Other known systems facilitate synchronization between recordings, and are particularly useful for syncing sound to film.

Hanert, in U.S. Pat. No. 2,373,560, uses mechanical vibration of a recording instrument to introduce vibrato into a musical note being recorded. Welch (see U.S. Pat. No. 3,275,326) accomplishes stereophonic rerecording of cylinder or mechanical disc records by simultaneously recording on two magnetic tape tracks separate signals electrically and acoustically derived from the original phonograph record.

Clearly, none of the aforementioned prior art systems are useful for enhancing a master recording so as to achieve a "big sound." The present invention facilitates such electronic recording enhancement of a single perfect tape, thereby eleminating the need for costly and difficult retakes by the musician.

The inventive system also may be used to produce a so-called "quad" sound from a conventional two-channel stereophonic tape. In "quad" music reproduction systems, four speakers are used. The left and right front speakers correspond to those in a conventional stereophonic system. Another pair of speakers, typically situated behind the listener, provide time-offset sounds which simulate an actual concert hall of stadium environment. In the past, special four-channel tapes have been used to drive the "quad" speakers. It has not been possible to provide realistic "quad" sound while playing back a conventional two-channel stereophonic tape. However, such "quad" sound reproduction is facilitated by the present invention.

SUMMARY OF THE INVENTION

In accordance with the present invention, there is provided a recording enhancement system including apparatus for playing back a magnetic tape master recording through first and second reproduce heads spaced along the direction of tape travel. Playback output from the first reproduce head is recorded on another magnetic tape and thereafter played back as the tape reaches a third reproduce head. By adjusting the between head tape transit time in the recording apparatus to be slightly different from that of the master playback apparatus, and combining the playback outputs of the second and third reproduce heads, an enhanced version of the master recording is produced.

The inventive system may be implemented using three conventional magnetic tape recorders. The first is used to play back the master recording, with the usual record head being operated in the playback mode to function as the first reproduce head. The second recorder includes the record head and third reproduce head mentioned above, and also may be provided with a speed control for adjusting the between head tape transit time to be either faster or slower than that in the master playback apparatus. The third recorder may be used to record the combined second and third record head outputs to produce on a system output tape an enhanced version of the master recording.

The inventive system also is applicable for "quad" sound reproduction from a conventional two-track stereophonic tape. For this function, the conventional stereo tape playback outputs are used to drive a first pair of speakers. The record heads in the tape playback device are operated in the reproduce mode, and their output fed to the record heads of dual-track recorder optionally employing an endless magnetic tape. The reproduce heads of this recorder are downstream of the record heads, and the outputs derived therefrom are used to drive a second pair of speakers. The relative between head tape transit times of the playback and recording devices are adjusted so that the second pair of speakers project the reproduced stereo tape information in either leading or lagging time relationship with the first pair of speakers.

Thus it is an object of the present invention to provide a method and system for enhancement of a master recording.

Another object of the invention is to provide apparatus facilitating "quad" sound reproduction of a conventional two-channel stereophonic tape.

A further object of the present invention is to provide a master recording enhancement system including a first magnetic tape recording device having a pair of spaced playback heads each reproducing the master recording, a second recording device having spaced record and playback heads and used to rerecord and reiterate the master recording, and means for combining playback outputs of the first and second devices to achieve an enhanced version of the master recording.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENTS

Figures 1, 2:
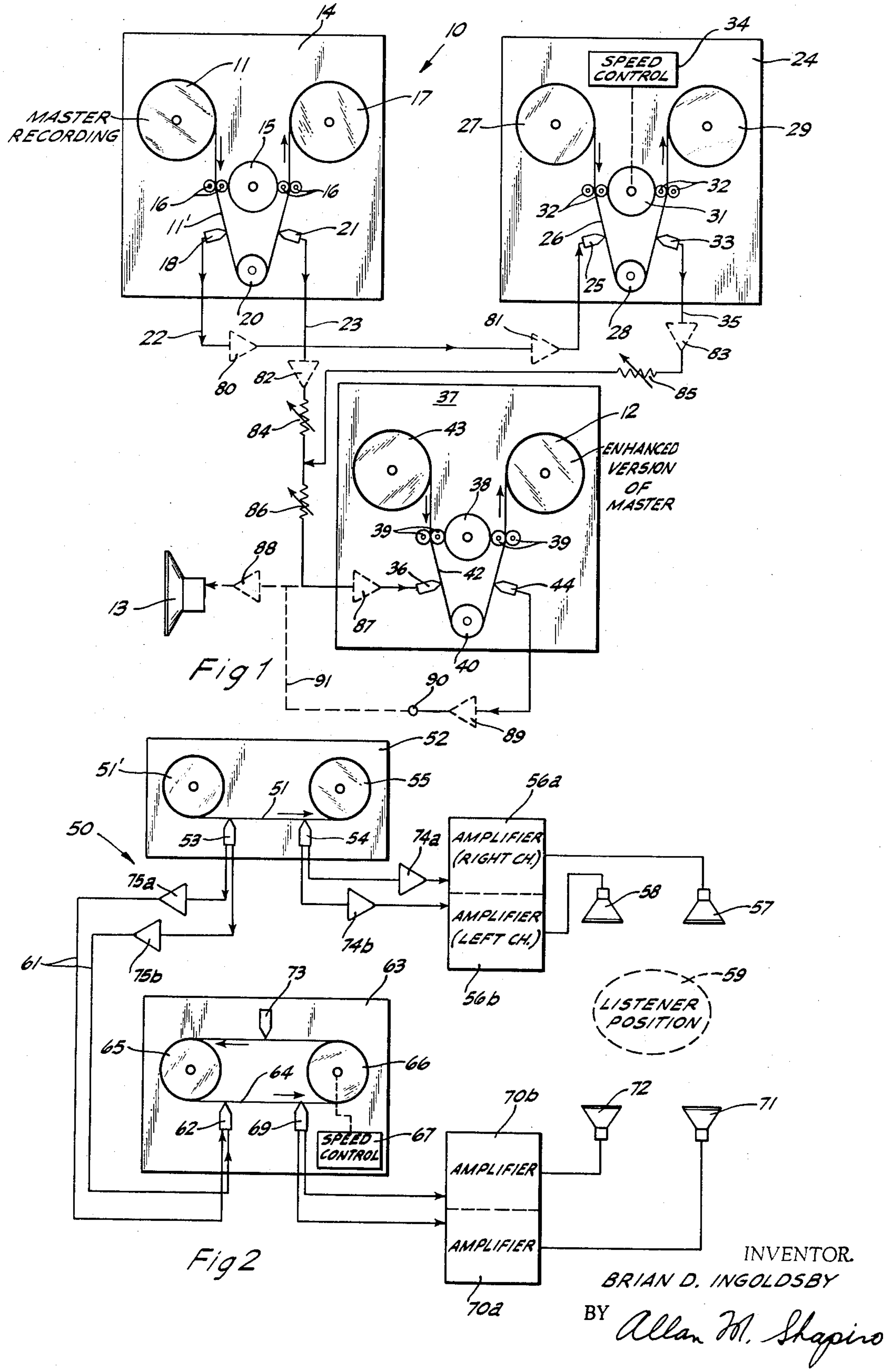
FIG. 1 is a simplified diagrammatic view of a recording enhancement system in accordance with the present invention.
FIG. 2 is a simplified diagrammatic view of apparatus for "quad" sound reproduction from a conventional two-channel stereophonic tape.

Referring now to the drawings, and particularly to FIG. 1 thereof, there is shown a recording enhancement system 10 in accordance with the present invention. System 10 accepts a prerecorded magnetic tape master recording 11, and produces as a system output a new magnetic tape recording 12 comprising an enhanced version of master recording 11. During production of recording 12, the enhanced version may be monitored via a loudspeaker 13.

To accomplish enhancement, master recording 11 is played back on a conventional recording apparatus 14 having a capstan 15 and wheels 16 for driving magnetic tape 11' from the master recording 11 supply reel to a take-up reel 17. Tape 11' is driven first past a record head 18, around an idler wheel 20, and then past a reproduce head 21. In the present system, head 18 is operated in the playback mode, and thus functions as a reproduce head and not as a record head. Accordingly, heads 18 and 20 provide along respective lines 22 and 23 identical reproductions of master recording 11, separated in time by a duration corresponding to the transit time taken by tape 11' to move between reproduce heads 18 and 21.

System 10 (FIG. 1) further comprises a second magnetic tape recording apparatus 24 having a record head 25 connected to line 22 so as to rerecord master recording 11 onto a blank magnetic tape 26 supplied from a reel 27. Tape 26 is driven past head 25, around an idler wheel 28 and thence to a take-up reel 29 by means of a capstan 31 and associated drive wheels 32. Apparatus 24 also includes a reproduce head 33 situated "downstream" of record head 25, so that information recorded by head 25 is available for playback by head 33 after a duration equal to the between head transit time of tape 26. This duration may be adjusted by means of a speed control 34 associated with drive capstan 31.

The playback output of apparatus 24, supplied on a line 35 by head 33, thus comprises another identical reproduction of master recording 11. If the between-head transit times of tapes 11' and tape 26 are identical, the reproductions of master recording 11 present on lines 23 and 35 will be coincident. By making the between-head transit time of tape 26 slightly less than that of tape 11', the reproduction on line 35 will occur earlier in time than the reproduction on line 23. Conversely, if the between-head transit time of tape 26 is slightly longer than that of tape 11', the reproduction on line 35 will occur later in time than that on line 23. Of course, the lead or lag between the reproductions on line 23 and 35 may be adjusted using speed control 34.

Referring still to FIG. 1, the master recording reproductions on lines 23 and 35 are combined and supplied to monitor speaker 13 and to a record head 36 on a third magnetic tape recording apparatus 37. Apparatus 37 includes a capstan 38, drive wheels 39 and an idler wheel 40 for directing past record head 36 a blank magnetic tape 42 supplied from a reel 43. The recording produced on tape 42, including the combined reproductions from lines 23 and 35, comprises the enhanced version 12 of master recording 11. Apparatus 37 has a reproduce head 44 which may be used to play back the enhanced version 12 immediately after recording by head 36.

Using system 10 of FIG. 1, recording enhancement is achieved by combining separate reproductions of master recording 11. Since the between head transit times of tapes 11' and 26 are seldom if ever identical, the reproductions on lines 23 and 35 are not exactly coincident. As a result, the system output tape 12 contains not merely an amplified replica of master recording 11, but rather an "enhanced" version exhibiting, e.g., a "big sound."

By using speed control 34, an operator or "mixer" may vary the characteristics of the enhanced version 12 to achieve desired effects. For example, since the reproduction on line 35 may occur in time prior to that on line 23, the attack portion of a musical note or stanza may be enhanced. Alternatively, multiple voicing (useful, e.g., to make six violins sound like 30), reverberation, echo effects, and even the introduction of vibrato can be accomplished using recording enhancement system 10. Of course, the system output tape 12 itself can be used as the new master recording and played back on apparatus 14 for further enhancement.

Recording enhancement system 10 is shown in simplified form in FIG. 1. In accordance with conventional studio practice, master recording 11 may have multiple tracks, and contain the vocal portion of a selection on one track, and various instrumental portions on other tracks. Correspondingly, reproduce heads 18 and 21, although shown as single entities in FIG. 1, each may contain as many heads as the number of tracks on recording 11. Likewise, head 25 may contain the same number of heads each associated with a corresponding track on tape 26. Similarly, reproduce head 33 and lines 23 and 35 all may represent multiple elements associated with corresponding tracks of the master recording.

With such a multitrack system, any or all of the tracks on master recording 11 may be enhanced at a given time. For example, only the track containing the vocalization may be enhanced. Enhancement of other tracks may be inhibited by not rerecording these tracks on tape 26.

Note that tape 26, supply reel 27 and take-up reel 29 could be replaced by a single endless loop of magnetic tape (not shown) with an appropriate erase head provided downstream of reproduce head 33.

A typical configuration of playback and record amplifiers and equalizers is shown in phantom in FIG. 1. Thus the output of record head 18 is amplified by a playback preamplifier 80 including a line level output equalizer conforming, e.g., to National Assocation of Broadcasters (NAB) standards. Preamplifier 80 in turn supplies a record amplifier 81 which also may include an NAB line level record equalizer.

Similarly, the playback signals from heads 21 and 33 may be amplified by respective playback preamplifiers 82 and 83 each provided with an NAB line level output equalizer. Separate level controls 84 and 85 may be used to balance the output levels from master recorder 14 and slave recorder 24. Another level control 86 is used to adjust the level of the combined signal, which signal then is amplified by a record amplifier 87 having an NAB line level record equalizer and supplied to record head 36.

The combined signal from level control 86 also may be amplified by an amplifier 88 and supplied to loudspeaker 13 to monitor the program. Further, the output from playback head 44 of tape recording apparatus 37 may be amplified by a conventional playback preamplifier 89 having an NAB line level equalizer. The signal from preamplifier 89 is available at terminal 90 as a system output, or may be supplied via a line 91 to the input of amplifier 88 for reproduction by loudspeaker 13.

Referring now to FIG. 2, there is shown an apparatus 50 also in accordance with the present invention and useful for producing a "quad" sound from a conventional two-channel prerecorded stereophonic tape 51 contained on a reel 51'. Tape 51 is played back on an apparatus 52 having a two-track record head 53, and downstream thereof, a two-track reproduce head 54 and a take-up reel 55. The outputs from reproduce head 54 are amplified by right and left channel playback preamplifiers **74*a* and 74*b* and amplifiers 56*a* and 56*b* to drive respective speakers 57 and 58. As a conventional stereophonic playback system, these speakers may be situated to the right and left in front of a listener at position 59**.

To produce a "quad" sound, record head 53 is operated in the reproduce mode, to provide on lines 61 a reproduction of the stereophonic tape 51 identical to that produced by head 54, but leading in time the head 54 output. The signals on lines 61 are amplified by amplifiers **75*a*, 75*b* and rerecorded via a two-track record head 62 in a magnetic tape recording apparatus 63. Head 62 records onto an endless loop 64 of magnetic tape continuously driven by wheels 65 and 66 at a rate adjustable by means of a speed control 67**.

Situated downstream of record head 62, with respect to motion of tape 64, is a two-track reproduce head 69 the outputs of which are supplied to amplifiers **70*a*, 70*b* driving respective speakers 61, 72. These speakers advantageously are situated behind listener position 59. Apparatus 63 also includes an erase head 73 for erasing tape 64 after it has passed reproduce head 69 but before the tape again reaches record head 62**.

In operation, reproduce head 54, amplifiers **56*a*, 56*b* and front speakers 57 and 58 conventionally play back stereophonic tape 51. However, prior to reaching head 54, tape 51 also is reproduced by head 53 and rerecorded onto tape 64. Thereafter, the rerecording is played back by head 69, amplified and directed to rear speakers 71 and 72. By adjusting the between head transit time of tape 64 to be different from that of tape 51, the sound projected from speakers 71, 72 will either lead or lag that projected from speakers 57 and 58. Accordingly, by appropriate adjustment of speed control 67**, the acoustical environment of a concert hall, stadium or the like can be simulated.

Note that devices 52 and 63 in "quad" sound system 50 correspond respectively to devices 14 and 24 in the recording enhancement system 10 of FIG. 1. In this regard, apparatus 63 need not utilize an endless magnetic tape 64, but could be implemented using a conventional recorder supplied with blank tape. Further, the "quad" outputs which drive speakers 57, 58, 71 and 72 may be recorded on four channels of a multi-track magnetic tape.

While the invention has been described with respect to a preferred physical embodiment constructed in accordance therewith, it will be apparent to those skilled in the art that various modifications and improvements may be made without departing from the scope and spirit of the invention.

I claim:

1. A system for enhancement of a master recording contained on a first magnetic tape, comprising:

a playback apparatus for reproducing said master recording, said playback apparatus having first and second reproduce heads spaced in that order along the direction of tape travel, said second reproduce head providing a playback output identical to that from said first reproduce head but delayed therefrom by a duration equal to the between head transit time of said first magnetic tape, a separate magnetic tape recording apparatus employing a separate, second magnetic tape and having a record head and a second-tape reproduce head spaced respectively along the direction of travel of said second magnetIc tape, said record head simultaneously rerecording the playback output of said first reproduce head onto said second magnetic tape, said reproducing thereafter being played back as said second magnetic tape passes said second-tape reproduce head, the transit time of said second magnetic tape between said record head and said second-tape reproduce head being slightly different from the between-head transit time of said first magnetic tape, and means for combining the playback output of said first tape as recovered by said second reproduce head and the playback output of said second tape as recovered by said second-tape reproduce head to develop an enhanced version of said master recording, said enhanced version comprising copies of the original master recording mutually separated in time by the difference in between head transit times of the separate playback and recording apparatuses.

2. A system as defined in claim 1 further comprising: speed control means associated with said recording apparatus for adjusting the between head transit time of said second magnetic tape.

3. A system as defined in claim 1 wherein said means for combining comprises apparatus for recording together on a system output tape said second and third reproduce head playback outputs.

4. A system as defined in claim 1 wherein said first reproduce head comprises a record head operated in the reproduce mode.

5. A system as defined in claim 1 wherein said second magnetic tape is endless, and further comprising tape erase means situated along the direction of tape travel between said reproduce head and said record head.

6. A method of enhancing a master recording contained on a first magnetic tape, comprising the steps of:

playing back said first magnetic tape on a playback apparatus having first and second reproduce heads spaced in that order along the direction of tape travel, said playback apparatus having a fixed between head transit time corresponding to the speed at which said master was recorded on said first tape, simultaneously recording the playback output of said second reproduce head onto a second magnetic tape via the record head of a separate magnetic tape recording apparatus, said recording apparatus having a second-tape reproduce head spaced further along the direction of tape travel from said record head for playing back said simultaneous recording, playing back said second tape via said second-tape reproduce head during the same passage as that on which said second tape is recorded, adjusting the transit time of said second tape between said record head and said second-tape reproduce head so as to be slightly different from said fixed between head transit time of said playback apparatus, and combining the playback outputs of said first reproduce head and said second-tape reproduce head to obtain an enhanced version of said master recording.

7. A method as defined in claim 6 wherein said combining comprises recording said first and third reproduce head playback outputs together on another magnetic tape.

8. A method as defined in claim 6 wherein said between head tape transit time in said recording apparatus is either faster than or slower than that in said playback apparatus, said third playback output thereby respectively leading or lagging said first playback output.

9. Apparatus for producing "quad" sound from a conventional, prerecorded two-channel stereophonic tape comprising:

a first tape player for playing back said prerecorded tape and having reproduce heads spaced along the direction of tape travel to provide first and second stereophonic outputs separated in a time by a duration corresponding to the fixed between head transit time of said prerecorded tape, a separate two-track magnetic tape recording apparatus having a stereophonic record head and a stereophonic reproduce head situated in that order along the direction of tape travel, a second magnetic tape moving past said record and reproduce heads at a speed such that the transit time between said record and reproduce heads differs slightly from said fixed between head transit time, and means for supplying the earlier occurring first stereophonic output from said first tape player to said stereophonic record head for recording on said second magnetic tape, the stereophonic reproduce head of said separate recording apparatus thereafter providing another stereophonic output identical to, but differing slightly in time with respect to the later occurring, second stereophonic output from said tape player.

10. Apparatus as defined in claim 9 further comprising:

a first pair of speakers receiving said later occurring tape player stereophonic output, and a second set of speakers receiving said apparatus stereophonic output.

11. Apparatus as defined in claim 9 wherein said second magnetic tape is endless, and further comprising means for erasing said endless magnetic tape after said tape has passed said apparatus reproduce head.

* * * * *